United States Patent Office 3,499,699
Patented Mar. 10, 1970

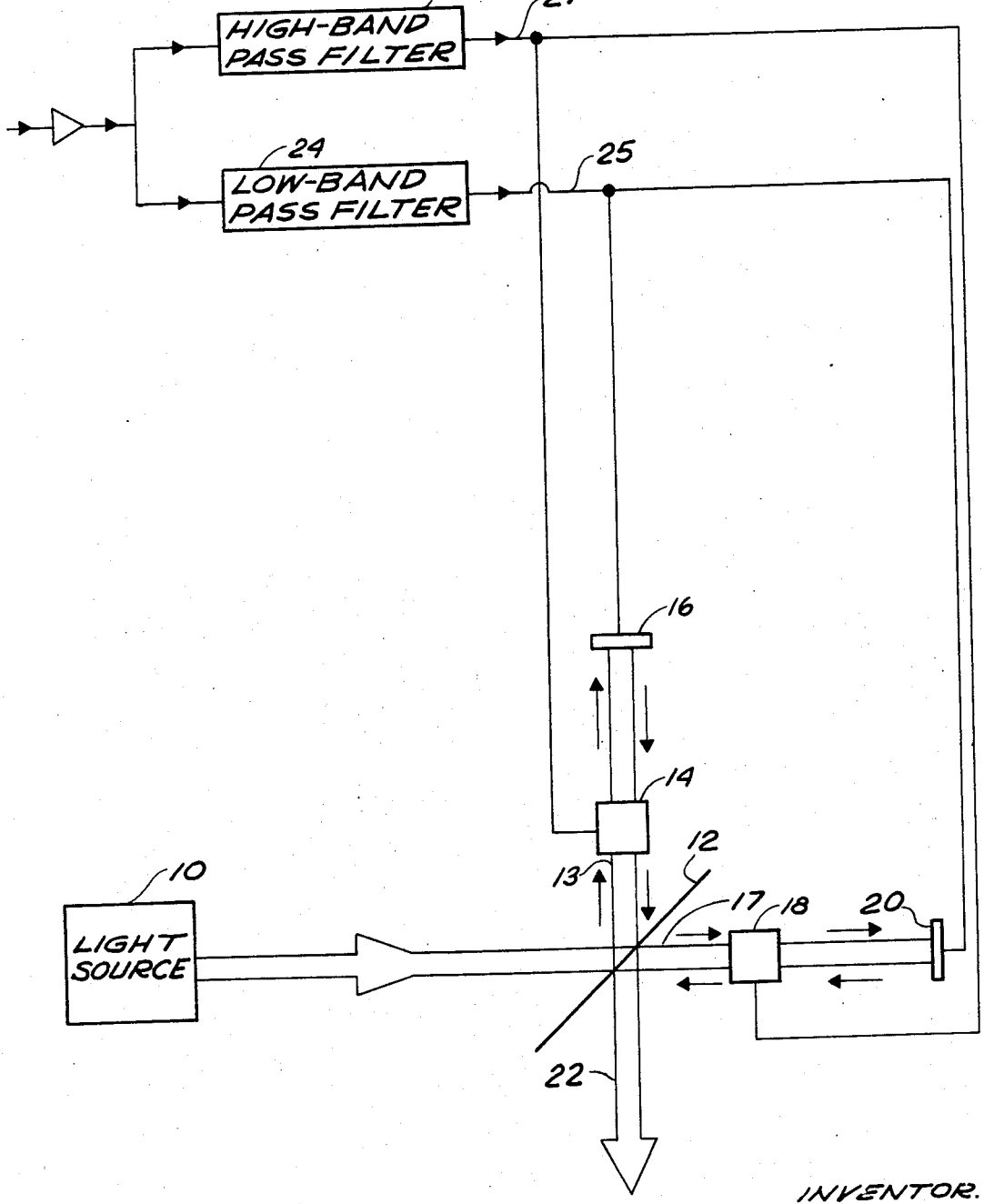

3,499,699
WIDE-BAND LIGHT-MODULATOR
Roy J. Ayres, Huntington Beach, and John R. Priebe, Torrance, Calif., assignors to North American Rockwell Corporation
Filed Sept. 21, 1965, Ser. No. 488,923
Int. Cl. G02f 1/26, 1/28; G02b 27/00
U.S. Cl. 350—150
12 Claims

ABSTRACT OF THE DISCLOSURE

A wide band light modulator wherein a light-beam is serially modulated by two different-type transducers, each of which responds to a different frequency-range. A plurality of electronic filters may be used to provide a cross-over function for directing specific frequencies to respective transducers.

INTRODUCTION

It is well known that information may be sent over wires, radio waves, and light beams; light beams having the advantage that they can carry much more information than other methods. In order to transmit information over a light beam, the light beam is "modulated," that is, one of its characteristics is varied with the information it is desired to transmit; and—by means well known to those skilled in the art—the modulated light beam is directed by a suitable optical system to a receiver that converts the modulations into a desired form, such as an electrical or audible signal. Ordinarily, the characteristic that is varied is the intensity of the light; this change of intensity being known as "intensity-modulation." The simplest form of intensity modulation is to insert a shutter into the path of a light beam, so that the emergent light is in the form of pulses, or bursts. Another way of intensity-modulating a light beam is to vary its intensity gradually, as by selective insertion and withdrawal of a variable-density filter. A further form of intensity-modulation uses the principle of "interference," which will be discussed later; and the present invention provides light-intensity-modulation—in part—by use of the interference principle.

In one prior-art interference method of intensity-modulating light, a beam of light—which is preferably monochromatic—is passed through a beam splitter that splits the light beam into two separate, preferably equal-intensity, light-beams, or light-components; and causes the two light-components to travel along different paths. The separated light-components are reflected from mirrors; and, by suitably positioning the mirrors, the separate light-components are recombined in a "constructive" or in a "destructive" interference-manner. Moving the mirrors produces a varying interference pattern that changes the intensity of the light beam. While the above-described apparatus is quite satisfactory as a light-intensity modulator, it has particular limitations that will be realized from the following discussion.

OBJECTS AND DRAWINGS

It is an object of the present invention to provide an improved light-modulator.

It is another object of the present invention to provide a light-modulator that is capable of intensity-modulating a light beam.

It is a further object of the present invention to provide a light-modulator that is capable of being excited by a wide frequency-range of electrical signals.

The attainment of these objects and others will be realized from the teachings of the following specification, taken in conjunction with the single drawing, which illustrates one embodiment of the invention.

SYNOPSIS

Broadly speaking, the present invention causes two separate beams of polarized preferably-monochromatic light to be directed along two different paths, each path preferably having two different devices that are responsive to different frequency-ranges of electrical signals; each device affecting the light in accordance with electrical signals applied to the device. The result is that the light traversing the two different paths is affected in somewhat different manners; and when the light is combined to produce a composite exit-beam, there is either constructive or destructive interference. As a result, the exit beam is modulated in accordance with the signals applied to the particular devices.

DESCRIPTION OF THE INVENTION

In the drawing, a beam of light from a light source 10 is directed toward a beam-splitter 12, which is shown as a semi-transparent mirror; but may be other types of beam-splitters, such as a Foster-Seeley prism, etc. As is well-known, a semi-transparent mirror causes some light to be reflected from it, and permits the remaining light to pass through it. In the drawing, the beam-splitter 12 causes a first light-beam 13 to be reflected "upwardly" (in the illustration), the light traversing a first electro-optic transducer cell 14 (which will be more fully discussed later) to impinge upon a reflective surface associated with a first electro-mechanical transducer 16. Assuming for the moment that neither transducer 14 or 16 is energized, the impinging light is reflected from the reflective surface, moves "downward" to again traverse electro-optic cell 14, and traverses beam-splitter 12.

Simultaneously, beam-splitter 12 permits a second light-beam 17 to pass through it, this second light-beam traversing a second electro-optic transducer cell 18 to impinge upon a reflective surface associated with a second electro-mechanical transducer 20. Assuming again that neither transducer 18 nor 20 is energized, the light is reflected from the reflective surface associated with transducer 20, traverses cell 18, and impinges upon beam-splitter 12. Here it is reflected "downward," and is combined in an interference manner with the first light-component that has traversed beam-splitter 12; the two light-beams forming a composite exit beam 22.

A slight digression is necessary at this point. Interference is achieved as follows. If transducers 16 and 20 are exactly the same distance from beam-splitter 12, light-beams 13 and 17 traverse an optical-path—including their reflection from the reflective surfaces associated with the transducers—of exacly the same length; and the light from the transducers arrives at beam-splitter 12 in an in-phase relation. This in-phase relation is known as "constructive" interference, and the emergent beam 22 is therefore at its maximum brightness. If however, the optical paths from the beam-splitter 12 to the transducers 16 and 20 and back to the beam-splitter have different lengths, the reflected light arrives at beam-splitter 12 in an out-of-phase relationship, this being known as "destructive" interference; and the exit light beam 22 is of a reduced brightness. If the original light-components are monochromatic and have equal intensities, the modulation due to interference will range—ideally—from a maximum intensity to extinguishment.

In operation, electrical signals are applied to electromechanical transducers 16 and 20, these electrical signals causing the transducers—usually piezo-electric crystals—to move in a piston-like manner parallel to the path of the impinging light; the movement of the separate electromechanical transducers 16 and 20 being in opposition, so that as one light-beam-path is lengthened, the other light-beam-path is shortened. As a result, depending upon the instantaneous signals applied to the transducers, the light beams 13 and 17 are combined at beam-splitter 12 in either a constructive or a destructive manner; and the composite exit beam 22 varies in intensity, depending upon the signals applied to transducers 16 and 20. A mild exciting electrical signal applied to the electro-mechanical transducers will cause them to move slightly, causing the intensity of composite exit beam 22 to vary slightly, whereas a strong exciting signal may cause exit beam 22 to be modulated from maximum brightness to extinguishment. An arrangement of this type is more fully described in a commonly assigned co-pending application, Ser. No. 294,585 (now U.S. Patent 3,302,027) Interferometric Method and Apparatus for Modulation and Control of Light by David L. Fried and Wendell S. Read, filed July 12, 1963.

Another slight digression is necessary at this point. It is known that an electrical signal transmits information, such as an oral message, by means of oscillations; and that a greater range, or spectrum, of oscillation permits more accurate transmission of desired information, or a greater plurality of information. Assume that a frequency range or spectrum, "F1" is desirable in order to transmit a particular type or amount of information. In order to transmit another similar type or amount of information, a similar frequency range or spectrum "F2" may be desirable. It is therefore obvious that in order to simultaneously transmit many such types of information, a large number of such frequency-spectra "F1, F2, F3" . . . are necessary.

If only a limited number of such adjacent frequency-spectra are available, this is known as a "narrow band"; whereas if a large number of such adjacent frequency-spectra are available, this is known as a "wide band"—the wide band, of course, permitting the simultaneous transmission of much more information.

In the interference-type light-modulator described above, it is therefore desirable to provide a wide band of frequencies; and to accomplish this, transducers 16 and 20 must be made as small and as lightweight as possible. The reason for this is as follows. Transducers 16 and 20 vibrate, or move, in accordance with the input signal; so that as the frequency of the input signal is increased, the transducer will vibrate at a progressively higher rate. However, at a particular frequency of input signal, the transducer vibrates in a "resonant" manner, which means that at this particular frequency it will vibrate with a very wide amplitude for a relatively small magnitude of input signal. This resonant vibration has the disadvantages that the amplitude of vibration, and therefore—in this case—the modulation of the exit light beam is out of all proportion to the input signal; so that this resonant frequency should be avoided. Therefore, the interference-type modulator described above has an upper frequency limit that is set by the resonant frequency of the transducers; and its useful range is from a relatively low frequency up to its resonant frequency. Since a small transducer has high resonant frequency, small transducers are used, as they provide the largest frequency band.

As discussed above, this limitation of frequency by the transducer inherently limits the number of frequency-spectra that can be used, and thus limits the electro-mechanical light-modulator to a frequency-band that is narrower than desirable.

The present invention extends the frequency range of the light-modulator in the following manner. An electro-optic transducer cell 14 is positioned in the path of the light beam; cell 14 preferably being of the Kerr or Pockels type. These cells are well known, and are described in various publications, such as "Fundamentals of Optics"—Jenkins and White, published by McGraw-Hill. Broadly speaking, a Kerr cell comprises a liquid that—when a voltage is impressed across it—operates upon the light passing through the cell. If the light happens to be linearly-polarized, the Kerr cell converts the light to elliptical-polarization; whereas if the light is already elliptically-polarized, the Kerr cell changes the ellipticity. These terms are discussed in the above-cited book. In each case, the resultant ellipticity depends upon the electrical signal applied to the Kerr cell. The Pockels cell is similar to the Kerr cell, except that—instead of comprising a liquid—it comprises a solid transparent material.

In the present invention, the light-components originally leaving beam-splitter 12 comprises similarly-polarized light, which may be obtained—for example—from a laser that inherently provides linearly-polarized monochromatic light. Beam-splitter 12 splits the incoming light into a two substantially equal-intensity similarly-polarized light-beams; a first light-beam 13 being directed upwardly, and a second light-beam 17 being directed to the right.

Assume that the electro-mechanical transducer 16 is not energized. The light from beam-splitter 12 impinges on cell 14, and emerges elliptically-polarized, having a particular orientation that depends primarily on the electrical signal applied to the cell. The light emerging "upwardly" from cell 14 impinges onto the mirrored surface associated with transducer 16, and is reflected "downwardly" to again traverse cell 14, where its ellipticity is again modified. Thus the electro-optic cell 14 operates twice on the light-component directed upwardly by beam-splitter 12, to produce an appreciable effect with a relatively small electrical signal applied to the cell 14.

Electro-optic cell 18 operates in the same manner as cell 14; so that if cells 14 and 18 are energized to exactly the same extent, both reflected light-components have their ellipticities modified by exactly the same amount. Under this condition constructive interference occurs at beam-splitter 12, and the emergent light-beam 22 has a maximum intensity. If however, different exciting signals are applied to the individual electro-optic cells 14 and 18, or if the same signals are applied in opposition to the individual cells, each cell modifies the polarization-ellipticity of the light traversing that cell. Under this condition, a given amount of destructive interference occurs at the beam splitter; and the intensity of the exit beam 22 varies because of the interference at beam-splitter 12. Thus, by applying suitable signals to electro-optic cells 14 and 18, the emergent beam 22 may be intensity-modulated.

Thus, whereas the electro-mechanical transducers produce intensity-modulation by changing the path-lengths, the electro-optic cells produce intensity-modulation by varying the polarization; in each case the interference pattern at the beam-splitter producing the actual intensity-modulation; the paired transducers and the paired cells each having mutually opposite sense variations.

It was previously pointed out that transducers 16 and 20 were limited to a relatively low frequency range, because of their necessity for mechanical movement. However, electro-optic cells 14 and 18 do not undergo any mechanical movement, and are therefore useful at relatively high frequencies. In accordance with the present invention, electro-mechanical transducers 16 and 20 are designed to operate in a lower frequency-range, up to the limit of their usefulness; and electro-optical cells 14 and 18 are designed to operate in a higher frequency-range that extends upwardly from somewhat below the upper limit of transducers 16 and 20. Thus, incoming signals of lower frequencies are applied to the electro-mechanical transducers, and incoming signals of higher frequencies are applied to the electro-optic cells.

The drawings shows electronic circuitry wherein the incoming signal is amplified, and is then divided into two frequency-ranges. A low-band pass-filter 24 applies the lower-frequency signals over wire 25 to transducers 16 and 20, thus preventing them from vibrating at their resonant frequency; and a high-band pass-filter 26 applies the higher-frequency signals over wire 27 to the cells 14 and 18. In this way, an incoming signal is divided into frequency-ranges that are directed to the device that most efficiently uses that frequency range to modulate the light beam.

The Kerr and Pockels cells previously mentioned have the characteristic that the exciting signals are applied to the light-entering and light-leaving faces of the cell; and this characteristic has required the use of transparent electrically-conductive coatings on these faces of the cell. This requirement has the disadvantage that the light beams must traverse the coats. Other, similar electro-optic cells—known as "transverse" cells—have the characteristic that their exciting signals are applied to other faces of the cell; and these tranesverse cells are preferable. Therefore, the term electro-optic cell is to be construed as any cell that operates in either of the above-described manners.

The previous discussion has been related to electro-optic cells that change the ellipticity of the transitting light. It is known that other electro-optic cells, such as those comprising materials like ammonium dihydrogen phosphate, have an index of refraction that depends upon the electric field across the cell. As the electric field is varied, a change in index-of-refraction is obtained; and as the index-of-refraction changes, it changes the time required for light to pass through the cell. This means that there is an effective change in the path-length through which the light passes. This change in effective path-length occurs even though there is no actual physical change in path-length.

It may be seen, referring back to the drawing that if cells 14 and 18 were to comprise materials of this type, the applied voltage will change the effective path-length, so that the reflected light impinging upon beam-splitter 12 will have a phase relationship that depends upon the applied electrical signals; these signals therefore producing an interference pattern that modulates the output beam 22. In this way, electro-optic cells 14 and 18 may be of the Kerr and Pockels type, or of the transverse type, these requiring polarized light; or of the last-described type requiring just normal light.

Thus, the invention acts like an interferometer that has two different transducer means in each leg, the different transducers being responsive to different frequency ranges, and effecting mutually opposite sense variations; i.e., variations in length or polarization.

What is claimed is:
1. The combination comprising:
lightsource means for transmitting a lightbeam along and optical path;
first transducer means, responsive to a first frequency-range, positioned in said path, changing the effective length of said path;
second different-type transducer means, responsive to a second frequency-range, positioned in the same path changing the effective length of said path; and
means, positioned in said optical path, sensing the charge in overall effective length of said path in accordance with the different frequency-ranges of the signals applied to the different-type transducers.

2. The combination comprising:
lightsource means transmitting a light-beam along an optical path;
first transducer means, comprising a reflective surface, and responsive to a first frequency-range, positioned in said path, changing the effective length of said path;
second transducer means, comprising a transparent material, and responsive to a second frequency-range, positioned in said path, changing the effective length of said path; and
means, positioned in said optical path, sensing the change in overall effective length of said path.

3. In combination with a source of radiant energy for transmitting an energy beam along an optical path, the combination comprising:
means, positioned in said optical path, splitting said energy beam from said source into two beams, and directing the separated beams along respective first and second paths;
means, comprising a first-type transducer responsive to a given frequency range, positioned in each of said paths, effecting mutually opposite sense variations of said paths;
means, comprising a second-type transducer responsive to a different frequency-range, positioned in each of said paths, effecting mutually opposite sense variations of said paths; and
means, positioned in respective said paths, combining from said different paths, portions of the energy beams subject to said transducers.

4. In combination with a source of radiant energy for transmitting an energy beam along an optical path, the combination comprising:
means, positioned in said optical path, splitting said energy beam from said source into two beams, and directing the separate beams along respective first and second paths;
means, comprising an electro-mechanical transducer responsive to a given frequency-range, positioned in each of said paths, effecting mutually opposite sense variations of the lengths of said paths; and
means, comprising an electro-optical transducer responsive to a different frequency-range positioned in each of said paths, effecting mutually opposite sense variations in the lengths of said paths; and
means, positioned in a mutually common portion of said paths, interferometrically combining portions of said beams from said paths.

5. An optical modulator comprising:
lightsource means directing a beam of light along a given optical path;
electro-mechanical transducer means, positioned in said path, modulating said lightbeam in response to signals of a given frequency range; and
electro-optic cell means, positioned in said path modulating said lightbeam in response to signals of another given frequency range, said transducer and said cell responding to electrical signals in different frequency ranges.

6. An optical modulator for modulating light that is being transmitted along two separate optical paths, comprising:
a pair of piezo-electric transducers, a piezo-electric transducer being positioned in the path of each said separate beams of light;
means, associated with said transducers, reflecting respective beams of light from each of said transducers;
means, positioned in a common portion of the paths of lightbeams, combining said reflected beams of light in an interference manner to produce is composite output beam of light;
means applying an electrical signal in a given frequency-range to said transducers, modulating said composite output beam of light;
a pair of electro-optic cells, an electro-optic cell being positioned in the path of each of said separate beams of light; and means applying an electrical signal in a different frequency range to said cells, for additionally modulating said composite output beam of light.

7. An optical modulator for modulating the light produced by a light source, said light being split into two lightbeams that travel along two separate optical paths, comprising:
a pair of first transducers positioned in respective paths of each of said separate beams of light;
means, associated with respective transducers, reflecting separate beams of light from respective ones of said transducers;
means, positioned in a common portion of said optical paths, combining said reflected beams of light in an interference manner to produce a composite output beam of light;
a pair of second transducers positioned in respective paths of each of said separate beams of light;
means dividing a modulating electrical signal into two frequency-spectrums;
means applying one of said frequency-spectrums to said first transducers to modulate said composite output beam of light; and
means applying the other of said frequency-spectrums to said second transducers to additionally modulate said composite output beam of light.

8. An optical modulator comprising:
a lightsource;
beam-splitter means, positioned in the path of the light from said source, splitting the light from said source into two separate lightbeams;
a pair of piezo-electric transducers, responsive to signals of a first frequency-spectrum, positioned in respective light beams;
means, positioned on respective said transducers, reflecting said separate beams of light from each of said transducers;
means, comprising said beam-splitter means, combining said reflected beams of light in an interference manner to produce a composite output beam of light;
an electro-optic cell, responsive to signals of a second frequency-spectrum, positioned in the path of each of said separate beams of light;
means dividing a modulating electrical signal into said two frequency-spectrums;
means applying one of said frequency-spectrum to said transducers to modulate said composite output beam of light in a given frequency range; and
means applying another of said frequency-spectrums to said cells to additionally modulate said composite output beam of light in another frequency range.

9. An optical modulator comprising:
a lightsource;
beam-splitter means, positioned in the path of the light from said source, splitting the light from said source into two separate lightbeams;
a pair of piezo-electric transducers positioned in respective light beams;
means, positioned on respective said transducers, reflecting separate beams of polarized light from each of said transducers;
means, comprising said beam-splitter, combining said reflected beams of polarized light in an interference manner to produce a composite output beam of light;
an electro-optic cell, capable of affecting polarized light, positioned in the path of each of said separate beams of light;
means dividing a modulating electric signal into two frequency-spectrums;
means applying one of said frequency-spectrums to said transducers to modulate said composite output beam of light; and
means applying the other of said frequency-spectrums to said cells to affect the light's polarization, and thus additionally modulate said composite output beam of light.

10. In combination with a light source that produces an incoming beam of light, an optical modulator comprising:
beam splitter means, positioned in the path of said incoming beam of light splitting said incoming beam of light into two separate light-components;
means, positioned in respective paths of said separate light-components, reflecting said separate light-components from separate piezo-electric transducers;
means, comprising said beam-splitter means, combining said reflected light-components in an interference manner to produce an output beam of light—whereby electrical signals applied to said transducers intensity-modulate said output beam of light, said modulation being below the resonant frequency of said transducers;
an electro-optic cell positioned in the path of each of said light-components—whereby said cells additionally modulate said light-components, said additional modulation being above the resonant frequency of said transducers, said combination of transducers and electro-optic cells permitting a wide range of modulation frequencies.

11. In combination with a light source that produces an incoming beam of light, an optical modulator comprising:
beam-splitter means, positioned in the path of said incoming beam of light—whereby an incoming beam of light may split into two separate polarized light-components;
means, positioned in respective paths of said separate light-components, reflecting said separate polarized light-components from separate piezo-electric transducers;
means, comprising said beam-splitter means, combining said polarized reflected light-components in an interference manner to produce an output beam of light—whereby electrical signals applied to said transducers modulate said output beam of light, said modulation being below the resonant frequency of said transducers;
an electro-optic cell positioned in the path of each of said polarized light-components, said cells having the ability to vary the ellipticity of polarization of said light-components—whereby said cells additionally modulate said light-components, said additional modulation being above the resonant frequency of said transducers, said combination of transducers and electro-optic cells permitting a wide range of modulation frequencies.

12. In combination with a light source that produces an incoming beam of light, an optical modulator comprising:
polarizing beam-splitter means, positioned in the path of said incoming beam of light—whereby an incoming beam of light may be split into two equal-intensity separate differently-polarized light-components;
means, positioned in respective paths of said separate light-components, reflecting said separate light-components from separate piezo-electric transducers;
means, comprising said beam-splitter means, combining said reflected light-components in an interference manner to produce a composite output beam of light—whereby electrical signals applied to said transducers modulate said composite beam of light, said modulation being below the resonant frequency of said transducers;
an electro-optic cell positioned in the path of each of said light-components, said cells having the ability to rotate the plane of polarization of said light-components—whereby said cells additionally modulate said light-components, said additional modulation being above the resonant frequency of said transducers, said combination of transducers and electro-optic cells permitting a wide range of modulation frequencies;

means separating the modulating signals into a first frequency-spectrum below the resonant frequency of said transducers, and into a second frequency-spectrum above the resonant frequency of said transducers;

means applying only signals of said first frequency-spectrum to each of said modulators; and means applying only signals of said second frequency-spectrum to each of said modulators.

References Cited

UNITED STATES PATENTS

| | | | |
|---|---|---|---|
| 3,272,988 | 9/1966 | Bloom et al. | 350—150 X |
| 3,302,027 | 1/1967 | Fried et al. | 350—163 X |

FOREIGN PATENTS 342,219  1/1931  Great Britain.

PAUL R. GILLIAM, Primary Examiner

U.S. Cl. X.R.

350—160, 163